United States Patent [19]
Edden

[11] 3,778,927
[45] Dec. 18, 1973

[54] AMUSEMENT AND EDUCATIONAL DEVICE

[76] Inventor: Benjamin Edden, 92 Bert Zait, Jerusalem, Israel

[22] Filed: Aug. 17, 1970

[21] Appl. No.: 64,448

[52] U.S. Cl. ............................................. 46/233
[51] Int. Cl. ............................................ A63h 17/26
[58] Field of Search ................. 46/233; 310/4, 7; 35/19

[56] References Cited
UNITED STATES PATENTS

| 3,158,955 | 12/1964 | Sturgis | 46/233 X |
| 2,182,957 | 12/1939 | Blanck | 46/233 |
| 74,815 | 2/1868 | Funston | 46/233 |

FOREIGN PATENTS OR APPLICATIONS

| 259,486 | 6/1949 | Switzerland | 46/233 |
| 137,675 | 1/1920 | Great Britain | 46/233 |

Primary Examiner—Louis G. Mancene
Assistant Examiner—D. L. Weinhold
Attorney—Benjamin J. Barish

[57] ABSTRACT

An amusement and educational device comprises a container having a closed compartment all the walls of which are of electrically insulating material, and a plurality of beads disposed in the compartment. The beads are of electrically insulating material and of small size such that after the container is shaken, a sufficient static electrical charge is produced by friction on the beads to support the upper ones against gravity in the compartment when the device is placed at rest. The front wall, and preferably also the rear wall, are made of transparent material to permit viewing the beads therein. In the preferred embodiment described, there are a plurality (five) of such compartments each separate and distinct from the others and each containing a plurality of differently colored spherical beads providing a dimensional effect.

9 Claims, 4 Drawing Figures

PATENTED DEC 18 1973 3,778,927

INVENTOR
BENJAMIN EDDEN

By

ATTORNEY

AMUSEMENT AND EDUCATIONAL DEVICE

BACKGROUND OF THE INVENTION

1. Field of the Invention

The present invention relates to amusement and educational devices, and particularly to such devices which operate according to the phenomenon by which static electricity is produced by friction. Such devices may be used for entertainment and amusement purposes, and also for educational purposes to demonstrate the above phenomenon.

2. Description of the Prior Art

It is well known that electric charges are produced by friction when two substances are rubbed together, and that if the substances are substantially electrically insulating, the charges will be slow to dissipate. A classical experiment to demonstrate this phenomenon is by rubbing a rod of ebonite on a piece of fur, or a rod of glass on a piece of silk; a negative charge is produced on the ebonite or silk, and a positive charge is produced on the fur or glass. It is also well known that charges of the same kind repel each other, and of opposite kind attract each other, the force between the charged bodies varying directly to the amount of charge and inversely to the square of the distance between the charged bodies.

SUMMARY OF THE PRESENT INVENTION

The present invention provides an amusement or educational device based upon the above phenomenon. The devices of the present invention may be used for amusement purposes, for purposes of demonstrating the above phenomenon, and also for novelty articles such as paper weights and cigarette lighter bases.

According to the present invention, there is provided an amusement and educational device, comprising a container having a closed compartment therein, the walls of which compartment are made of electrically insulating material. A plurality of beads are disposed in the compartment. The beads are of electrically insulating material and of small size. The width of the compartment is slightly greater than the size of the beads, and at least one wall of the compartment is made of transparent material to permit viewing the beads therein.

When the container is shaken and then placed at rest, the beads at the top of the compartment appear to float in air against gravity. This effect results from the static charges produced on the beads (and also on the container walls) by friction which causes the beads to repel each other, whereby the upper ones are supported against gravity by the electrical charges produced.

In the preferred embodiment of the invention described below, the container includes one or more transparent insulating partitions disposed in aligned, spaced relation between the front and rear walls, to define a plurality of separate and distinct compartments, there being a plurality of the beads in each of the compartments. By this arrangement, there is produced a fuller field of floating beads, and also a three-dimensional depth effect.

The beads are preferably of spherical shape and of different colors, whereby different attractive patterns of beads are produced after each shaking.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
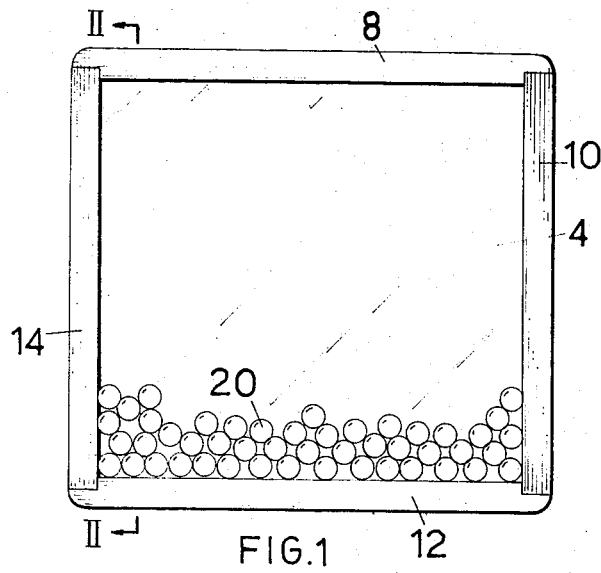
FIG. 1 is a front elevational view of one device constructed in accordance with the invention, the device being shown in its non-charged condition.

The device illustrated in the drawings comprises a container having a front wall 4 and a rear wall 6, both being joined by four peripheral side walls 8, 10, 12 and 14. The two opposed peripheral side walls 8 and 12 (normally forming the top and bottom of the device) are each formed with six equally-spaced grooves 8' and 12', respectively. The grooves at one end (left in FIG. 2) are adapted to receive the ends of front wall 4, and the grooves at the opposite end are adapted to receive the ends of the rear wall 6. The remaining four grooves 8' and 12' receive the ends of four partitions 16 for supporting them in aligned, spaced relation between the front and rear walls, to define five aligned compartments 18 between the latter walls. As can be seen from the drawings, each of the closed compartments has a length and a height many times that of its width.

All of the foregoing walls and partitions are made of electrically insulating material. In addition, front wall 4 and the partitions 16 are all transparent, whereas rear wall 6 may also be transparent, or it may be opaque.

Disposed in each of the five compartments 18 are a plurality of beads 20. The width of the compartments are each slightly greater than the size of the beads. These beads are of electrically insulating material and of small size such that when the container is shaken, a sufficient static electric charge is produced on the beads and on the partition walls 16 of the compartments by friction to support in apparent suspension at least the upper ones in their respective compartments against gravity. To reduce their weight, the beads may be hollow or may be each formed with an axial bore. These beads are of spherical shape and are preferably of different colors.

Figure 2:
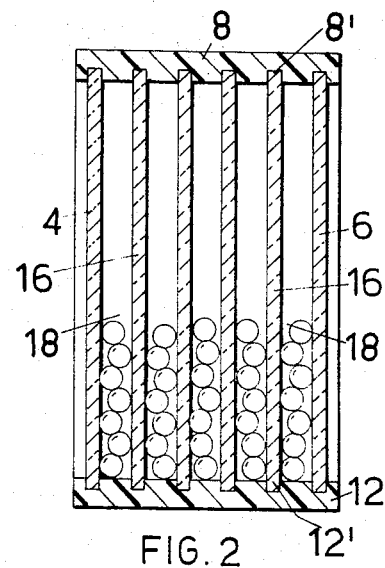
FIG. 2 is a sectional view along lines II—II of FIG. 1.
Figure 3:
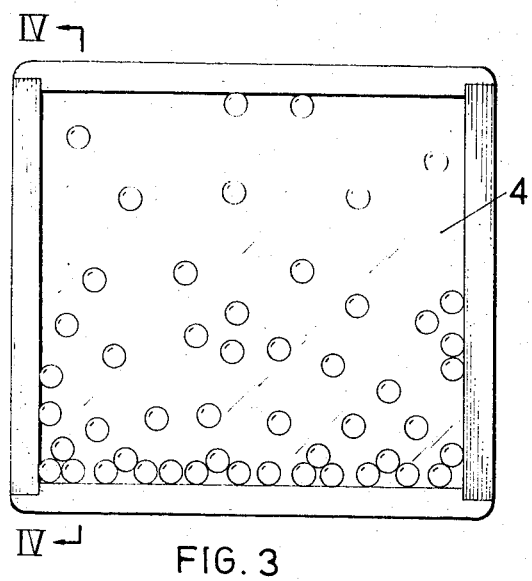
FIG. 3 is a front elevational view of the device of FIG. 1 in its charged condition, resulting from shaking the device.
Figure 4:
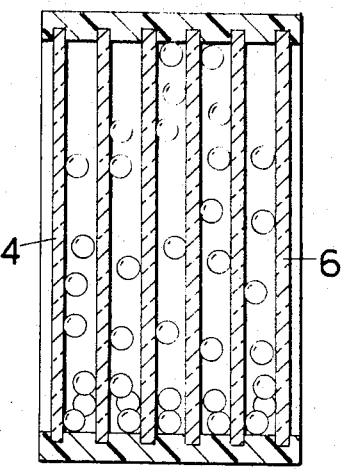
FIG. 4 is a sectional view along lines IV—IV of FIG. 3.

When the device is in its normal, non-charged condition, the beads 20 rest on the bottoms of their respective compartments as shown in FIGS. 1 and 2. When the device is strongly shaken, static charges are produced by friction on the beads 20 and also on the walls 4, 6, and 16 of the device. Sufficient static charges are produced to cause the beads to repel each other and also to be attracted to the walls of the device such that the beads at the upper part of their respective compartments are supported in apparent suspension against gravity for a substantial length of time after the device is placed at rest. Thus the beads appear to float in air against gravity. This is shown in FIGS. 3 and 4. When the device is lightly tapped or shaken, the beads will move, but the closely spaced compartment walls constrain the movement of the beads to an up-and-down movement, such that the beads appear to bounce in air.

An eye-catching effect is thus produced since the beads appear to defy the law of gravity.

By the provision of the plurality of compartments 18, a fuller field of floating beads is produced. Also, greater charges are apparently produced in the middle compartments than in the end ones, since usually more beads float at the upper parts of the middle compartments. The use of a plurality of compartments further creates a three-dimensional effect.

Different attractive patterns may be produced by the differently colored beads in the various compartments, and to change the pattern, it is only necessary to reshake the device and/or to rotate it so that a different peripheral end wall (8-14) assumes the bottom position.

As one example, all the walls 4-16 may be made of an acrylic resin, the beads 20 may be made of polyvinyl chloride, there may be about 40 of such beads in each compartment, each bead being of a diameter of 5 mm, and the width of each compartment (i.e., the spacing between partitions 16, and between same and front and rear plates 4,6) may be about 7 mm.

Of course, other insulating materials could be used for the walls, partitions, and insulating beads, also, a different number or a different form of compartments could be provided, e.g. annular compartments formed by concentric cylindrical partitions. Further, the dimensions of the beads and of the width of the compartments could vary, it being preferred that the beads be 3-6 mm in diameter, and that the width of the compartments be about 1-3 mm larger than the diameter of the beads.

As pointed out earlier, the device described may be used for amusement purposes, for demonstrating the phenomenon of electrostatic charges produced by friction, and may also be embodied in such novelty items as paperweights and cigarette lighter bases.

Many other variations, modifications and applications of the illustrated embodiment will be apparent.

What is claimed is:

1. An amusement and educational device, comprising, a container including a plurality of walls at least one of which is a partition wall defining at least two separate and aligned closed compartments each having a length and a height many times that of its width, the walls of said compartments being of electrically insulating material, and a plurality of beads of electrically insulating material disposed in each of said compartments, the width of said compartments being slightly greater than the size of said beads, the beads being of small size such that when the container is shaken a sufficient static electrical charge is produced by friction between the beads and the walls of said compartments to support a plurality of the beads in apparent suspension against gravity in the compartments for a substantial length of time after the device is placed at rest, the compartment walls constraining the movement of the beads when the device is lightly tapped so that the beads appear to bounce in air, at least one wall including said partition wall of said compartments being made of transparent material to permit viewing the beads therein, the beads being constrained to move only between the walls of their respective compartments, whereby a three-dimensional effect is produced with respect to the apparently suspended beads when the device is at rest.

2. A device as defined in claim 1, wherein said device includes a transparent front wall, a rear wall, and a plurality of peripheral side walls joining said front and rear walls, all said walls being made of insulating material.

3. A device as defined in claim 2, wherein said rear wall is also transparent.

4. A device as defined in claim 1, wherein said beads are of spherical shape, are all of the same diameter, and are differently colored.

5. A device as defined in claim 1, wherein said beads are 3-6 mm in diameter, are all of the same diameter, and wherein the width of said compartments is 1-3 mm larger than the diameter of said beads.

6. A device as defined in claim 2, wherein said front, rear, and partition walls are all rectangular in shape, and wherein at least two opposed peripheral side walls are formed with a plurality of spaced grooves for receiving the ends of the partition walls for supporting them in aligned, spaced relation.

7. A device as defined in claim 6, wherein said grooved peripheral side walls are also formed with grooves for receiving said front and rear walls, both the latter walls being thereby recessed from the front and rear faces of the container.

8. A device as defined in claim 1, wherein said container includes five of said compartments.

9. A device as defined in claim 1, wherein each of said compartments contains about 40 of said beads.

* * * * *